INVENTORS
Günter Eichholz
Horst Kergel
BY
Singer, Stern & Carlberg
Attorneys

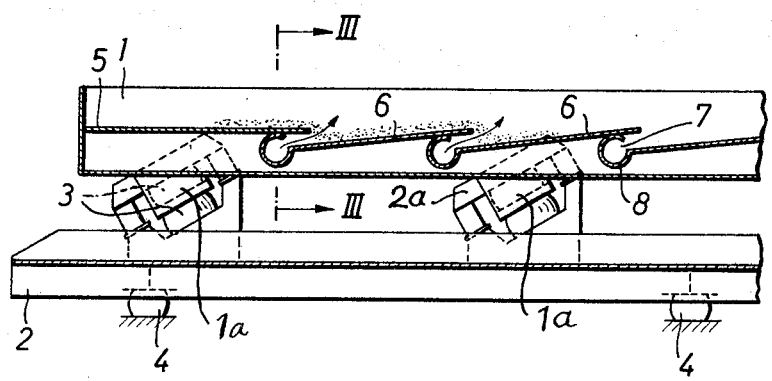
FIG. I
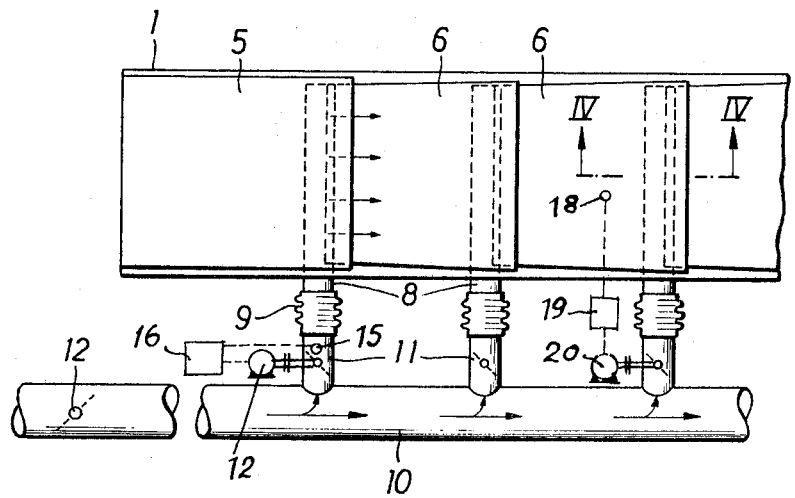
FIG. 2
INVENTORS
Günter Eichholz
BY Horst Kergel
Singer, Stern & Carlberg
Attorneys May 19, 1970  G. EICHHOLZ ET AL  3,512,267
OSCILLATING CONVEYOR Filed Oct. 16, 1968  2 Sheets-Sheet 2

United States Patent Office 3,512,267
Patented May 19, 1970

3,512,267
OSCILLATING CONVEYOR
Günter Eichholz, Cologne-Mulheim, and Horst Kerzel, Cologne-Bayenthal, Germany, assignors to Klockner-Humboldt-Deutz, Aktiengesellschaft, Cologne-Deutz, Germany, a corporation of Germany
Filed Oct. 16, 1968, Ser. No. 768,123
Claims priority, application Germany, Oct. 28, 1967, P 1,556,053
Int. Cl. F26b 19/00
U.S. Cl. 34—48    7 Claims

ABSTRACT OF THE DISCLOSURE

An oscillating conveyor for granular material comprises a plurality of substantially horizontally disposed individual trough sections, the ends of which are arranged in overlapping relation in such a manner that a gap is formed between the adjacent overlapping ends. Each gap is in communication with a nozzle-like slot or apertures formed in the wall of an individual supply pipe for a gaseous cooling or heating medium. Each one of the supply pipes is provided with a throttle valve and a pressure gauge and all of the supply pipes are connected to a common main line.

---

The invention relates to an oscillating conveyor for conveying granular or crumbly materials, particularly compounds for electrodes.

The conveyance of granular or crumbly materials between two steps of a processing method frequently is effected by an oscillating conveyor. Hereby it is oftentimes necessary during the conveyance of the material from one processing station to another, depending upon the processing method used, to keep the material at the same temperature, to cool it or to heat it. In conventional oscillating conveyors it has heretofore not been possible to bring the conveyed good in direct all-around contact with the usually gaseous heating or cooling media.

The object of the invention is to overcome the disadvantages of the known oscillating conveyors. This is accomplished in that the conveyor trough is subdivided into a plurality of individual sections which slope upward, viewed in the direction of conveyance, and overlap each other in a scale-like fashion, leaving a gap between the overlapping ends of each two sections, and in that each gap is in communication with a supply line for a gaseous cooling or heating medium. The advantage of this arrangement is that the conveyed material during its drop from the overlapping higher end of a preceding section onto the next following section below it is subjected to and penetrated by the cooling or heating medium flowing transverse to the direction of movement of the conveyed material so that the material is kept in direct all-around contact with the gaseous medium and, according to the operational requirements, is either maintained at the same temperature, is cooled or is heated.

According to one feature of the invention, the supply lines of each individual section of the conveyor trough are connected to a common main line.

Another feature of the invention provides for the installation of a throttle valve and a pressure gauge in each supply line so that different flow resistances occurring in the gap between each two sections of the conveyor, due to varying layer thicknesses, may be separately balanced for each individual section by corresponding throttle adjustments.

These and other features of the invention will be described in the following with reference to the accompanying drawings, in which:

FIG. 1 is a diagrammatic longitudinal sectional view of a portion of the oscillating conveyor according to the invention;

FIG. 2 is a top view of a portion of the conveyor trough of the oscillating conveyor;

Figure 3:
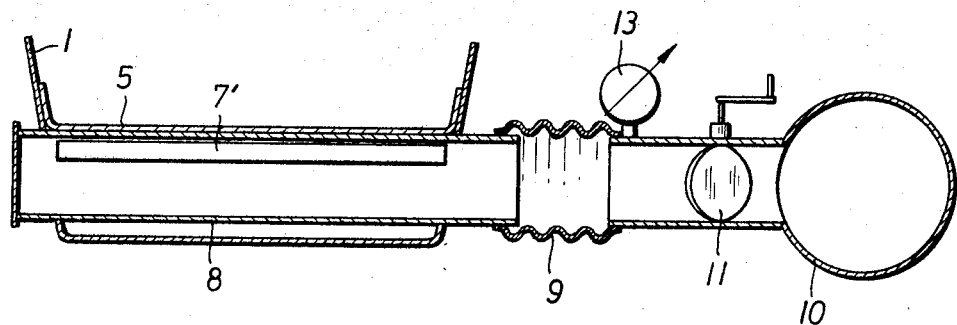
FIG. 3 is a cross-sectional view of the conveyor trough along the line III—III in FIG. 1.

Referring to FIG. 1, the oscillating conveyor according to the invention consists of a horizontally disposed conveyor trough 1 and an oscillating countermass 2 arranged parallel to the trough 1. Both parts 1 and 2 are oscillatably coupled with each other by means of rubber elements 3. Each rubber element 3 comprises two rubber pieces cut from a piece of stock and which are clamped between a laterally projecting lug 1a on the trough 1 and a yoke 2a secured to the countermass 2. The countermass 2 is elastically supported with respect to the foundation by rubber elements 4.

The oscillating conveyor is operated by a not illustrated straight crank drive in which an electric motor operating an eccentric is mounted on the countermass 2, while the connecting rod of the drive is pivoted to the lower face or the side walls of the trough 1. In very long conveyor troughs the crank drive is preferably arranged in the center of the device for the purpose of obtaining a stable oscillating movement. The left hand inlet end of the conveyor trough 1 is provided with a horizontal section 5 followed by separate overlapping section 6 each of which slopes upward toward the right and in the direction of conveyance, leaving a substantially vertical gap 7 between the overlapping right hand end of one section and the left hand end of the next section. In this manner the conveyor trough 1 is subdivided over its entire length into a number of step-like sections. Each gap 7 is formed on the underside of the conveying surface and is covered according to FIG. 4 by a supply pipe 8 having in its wall portion a slot 7′. This slot 7′ facing the lower left hand end of the next trough section 6 may be covered by a plate provided with apertures or small slits or by a screen.

From the top view of the conveyor trough 1 according to FIG. 2 it will be observed that one end of the supply pipes 8 are each connected with a common stationary main line 10 which extends parallel to the trough 1 by means of elastic cuffs 9, while the supply pipes 8 at their other ends are closed at 8′. In each branch of the main line 10 leading to one end of the pipe 8 is arranged a throttle valve 11 by means of which the amount of gaseous medium supplied to each individual gap 7 for cooling or heating is regulated. The total amount of gaseous medium can be adjusted by a main plate valve 12 arranged in the main line 10.

FIG. 3 illustrates in an enlarged scale an exemplary embodiment of a supply pipe 8. This supply pipe 8 is provided in its cylindrical wall with a lengthwise extending rectangular nozzle slit 7′ communicating with the gap 7. This slit 7′ extends over the entire width of the conveyor trough 1. Instead of this nozzle slit 7′, the supply pipe 8 may also be provided with closely spaced orifices or small slits.

Figure 4:
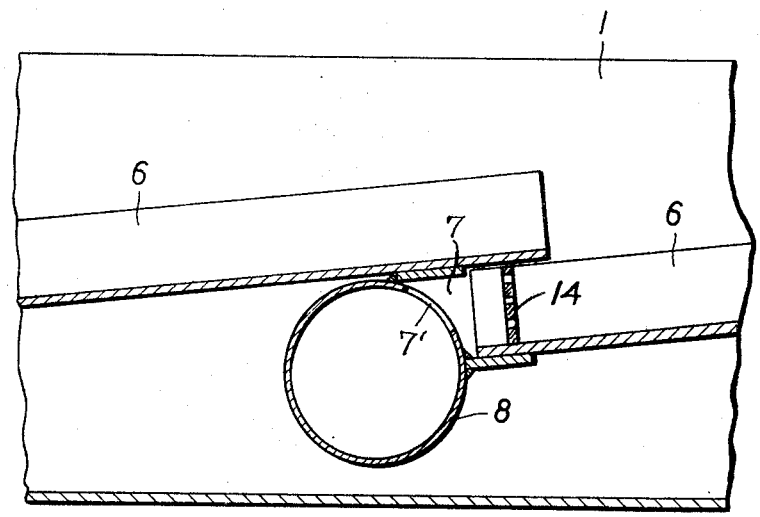
FIG. 4 is a sectional view showing in greater detail the supply pipe for the gaseous heating or cooling medium along the line IV—IV of FIG. 2.

According to FIG. 4, the gap 7 between each two adjacent overlapping sections 6 may be provided with an apertured plate or screen 14 to prevent the entrance of conveyed material into the supply pipe 8.

For indicating and regulating the feed of gaseous medium in each supply pipe 8, there is arranged behind each throttle valve 11 a pressure gauge 13 by means of which the cooling or heating medium charging the conveyed material in each individual section is controlled. If the oscillating conveyor is operated at a constant conveying capacity and a qualitatively uniform material, then it suffices to provide in place of the stationary pressure gauge a closable opening to which a pressure indicator is only once temporarily connected for the purpose of adjusting the throttle valve 11.

FIG. 4 illustrates a sectional view of the supply pipe 8 along the line IV—IV of FIG. 2. However, the invention is not confined to pipes 8 which are circular in cross-section, but other cross-sections may be used for the pipes 8 and the conduits supplying the cooling and heating media to the gaps 7 formed at the points where two trough sections overlap, and these modifications are within the scope of the invention. Thus, for example, each supply pipe 8 may be expanded below the left hand end of a trough section 6 to form a flat box which extends over the entire area of a section 6 and has adjacent the gap 7 a discharge opening for the gaseous medium in the form of a nozzle slot. This construction is particularly advantageous when the material conveyed is to be heated because then also the conveying surfaces of the individual sections 6 are heated.

For the purpose of protecting the environment from being polluted with dust, the oscillating conveyor may be provided along its entire length with one or several hoods which cover and surround the conveying trough as tightly as possible. These hoods are in communication with the suction side of one or several blowers so that a small low pressure may be adjusted to prevail above the layer of material in the conveying trough, thereby in known manner preventing the exit of dust. Furthermore, owing to this low pressure on top of the conveyed material and high pressure in the main line 10, the feeding of the gaseous medium acting upon the conveyed material can easily be regulated.

If a conveyor of the type indicated is used for materials with varying properties, the flow of the gaseous cooling or heating medium acting on the conveyed material may also be made to be automatically controllable. This is attained in accordance with FIG. 2 in an advantageous manner by coupling the throttle valves 11 with pressure adjusting devices instead of employing the pressure gauges 13. For this purpose, the stationary part of the supply pipe 8 is provided in its interior with a pressure sensitive transmitter 15 the signal of which is conducted to a transformer 16. The transformed signal is then employed to operate a motor 12 which adjusts the throttle valve 11. This adjusting device may be provided on all or only a few of the supply pipes 8.

If the conveyed material is to be maintained at a certain temperature or is to be heated to a higher temperature by means of a heating medium, then it is advisable to make the throttle valves automatic. For this purpose a temperature sensitive transmitter 18 extends from below into the respective section of the conveyor trough and the produced signal is conducted to a transformer 19 which conduct the transformed signal to a motor 20 which adjusts the throttle valve 11.

What we claim is:

1. An oscillating conveyor for conveying granular or crumbly materials, particularly compounds for electrodes, including a horizontally extending conveyor trough which is divided into a plurality of individual trough sections disposed to slope upward in the conveying direction and overlap each other at their ends in a scale-like fashion so as to form a gap between the overlapping ends of each two successive sections, and an individual supply pipe for a gaseous cooling or heating medium for each gap, said supply pipe being provided in its wall with at least one aperture which is in communication with said gap.

2. An oscillating conveyor according to claim 1, in which said individual supply pipes for said gaseous cooling or heating medium extend transversely of said trough and are connected with one of their ends to a common main line.

3. An oscillating conveyor according to claim 1, in which each of said individual supply pipes has installed therein a throttle valve and a pressure gauge.

4. An oscillating conveyor according to claim 1, in which each of said supply pipes extends transversely over the entire width of said conveying trough and is provided with a nozzle slot which is in communication with said gap formed between each two of said trough sections.

5. An oscillating conveyor according to claim 1, in which said gap between each two of said trough sections is selectively covered by an apertured plate or a screen.

6. An oscillating conveyor according to claim 3, in which said throttle valves disposed in said individual supply pipes are connected with automatic pressure control means.

7. An oscillating conveyor according to claim 3, in which said throttle valves disposed in said individual supply pipes are each connected with a temperature regulator which automatically operates the respective valve in relation to the temperature of the conveyor material in the respective trough section.

References Cited

UNITED STATES PATENTS

| | | | |
|---|---|---|---|
| 1,024,073 | 4/1912 | Hannam et al. | 34—236 |
| 3,112,186 | 11/1963 | Davis et al. | 34—164 X |
| 3,321,197 | 5/1967 | Parslow | 34—48 |
| 3,412,477 | 11/1968 | Kayatz | 34—164 |

CARROLL B. DORITY, JR., Primary Examiner

U.S. Cl. X.R.

34—54, 164, 241